March 30, 1971     B. O. MARTIN ET AL     3,572,995

BLOOD-OXYGEN MEASUREMENT AND METER

Filed June 5, 1968     3 Sheets-Sheet 1

INVENTORS:
BILLY O. MARTIN
and
ROBERT C. MARTIN.

Alvin E. Moore,
ATTORNEY.

United States Patent Office 3,572,995
Patented Mar. 30, 1971

3,572,995
BLOOD-OXYGEN MEASUREMENT AND METER
Billy Otis Martin and Robert Cherry Martin, Huntsville, Ala., assignors to Royal Medical Corporation, Huntsville, Ala.
Filed June 5, 1968, Ser. No. 734,811
Int. Cl. G01n 27/06, 33/16
U.S. Cl. 23—230                                    12 Claims

ABSTRACT OF THE DISCLOSURE

Apparatus and method for electrically and quickly measuring and indicating the amout of oxygen in blood. Through this process the ionized oxygen is converted to oxygen atoms in a blood-sample solution. The total value of the gradually reducing flow of these ions is determined in a circuit by current division, amplification, and summation in a capacitor. The final result is quickly seen on an indicator, calibrated to read in volume units of oxygen in a predetermined amount of tested blood. Economically disposable, quickly replaceable electrodes are positioned in the ionized solution. To prevent adherence of efficiency-destroying blood particles on them they are vibrated by an ultrasonic generator.

---

There are two known methods of roughly determining the oxygen content of blood. One method comprises two instruments, one of which electrically measures the conductivity of a sample of the blood, and the other determines the amount of hemoglobin contained in another sample of the same blood. Then from a chart a rough estimate of the proportion of oxygen in the blood is obtained. This chart has graphed curves that in the area from which the estimate is most often determined are nearly leveled off, so that the final reading is at best only roughly approximate. The other method, the Van Slyke technique, requiring a very large blood sample, is a chemical analysis that requires technicians of long training. Both methods require a considerable delay in obtaining the much-needed information—much longer than that in use of the present invention.

An object of the present invention thus is to provide an instrument for determining the quantity of oxygen in a sample of blood in a very small period of time, for example, 100 seconds. Another object is to present such an instrument which will efficiently measure the oxygen in only one cubic centimeter of blood. A further objective is to supply a blood-oxygen-measuring instrument, which may be quickly used in an operating room or other surgical environment, and from which quickly needed results may be immediately provided. Another purpose is to design such a device which is highly accurate. These and further objects of the invention will become more readily apparent from the following detailed description and from the accompanying drawings.

Figure 1:
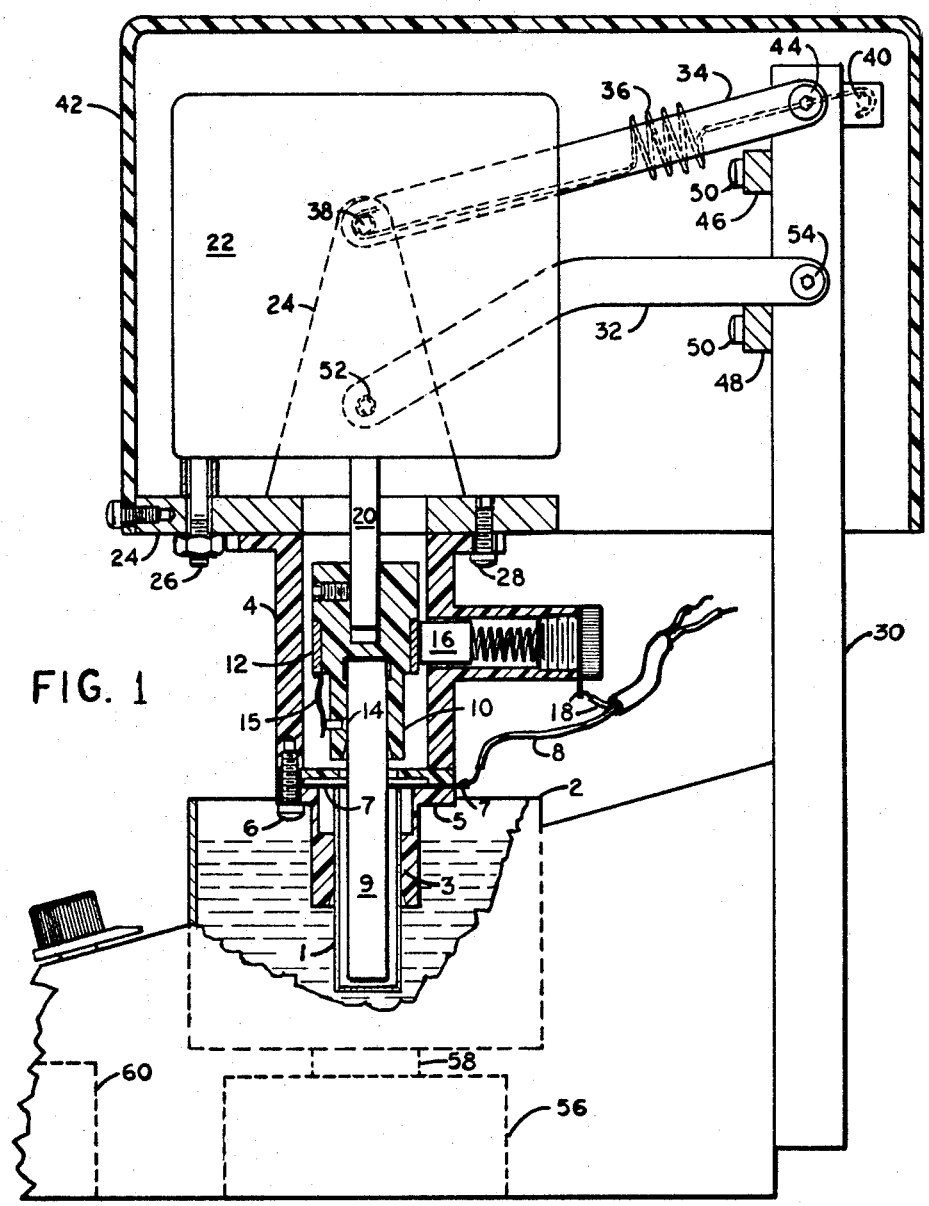
FIG. 1 is a side elevational view, with an upper part shown in section, of the invented instrument.
Figure 2:
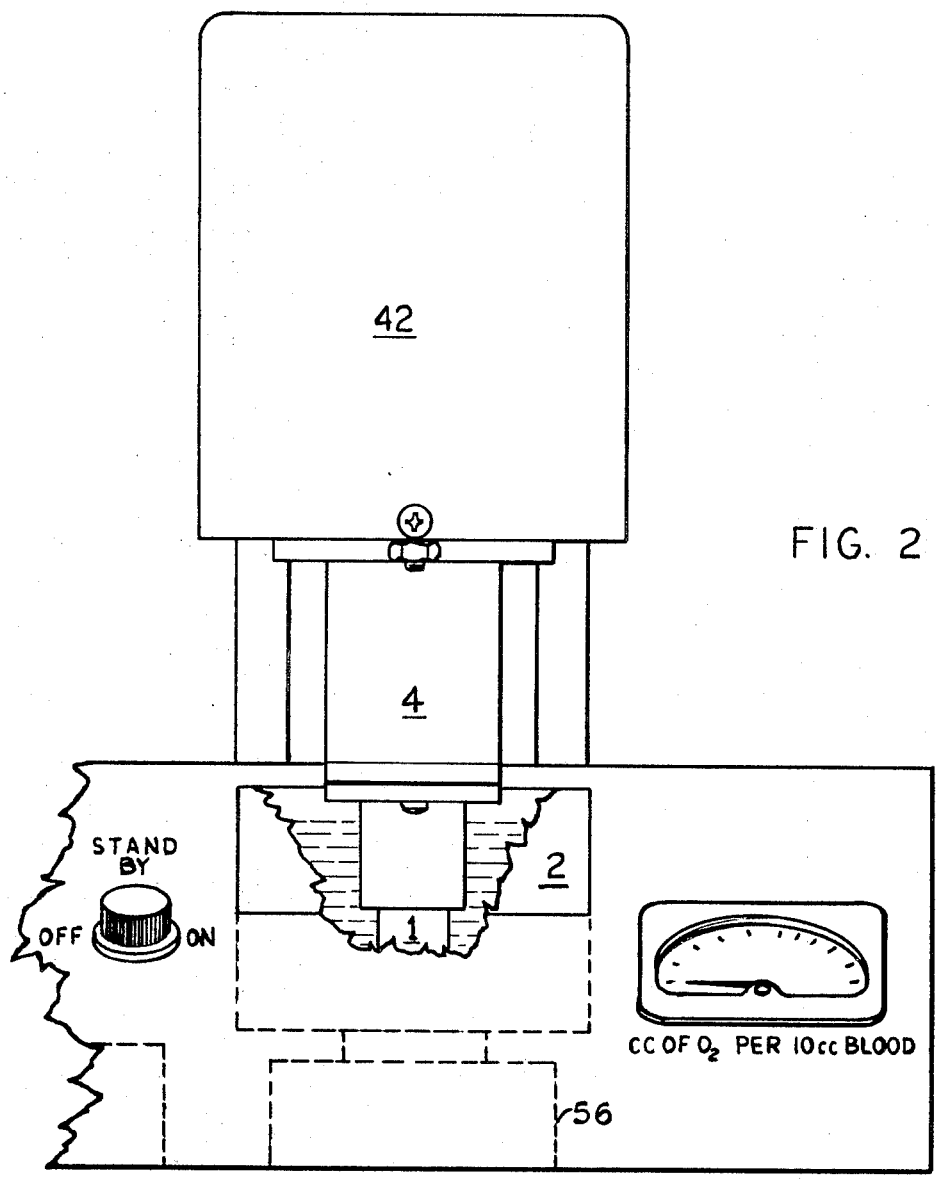
FIG. 2 is a front elevational view of the instrument.

In FIG. 1 the numeral 1 indicates a receptacle (shown as a vial) for holding a sample of the blood to be tested. This receptacle is in container 2, and temporarily and partially immersed in a liquid, for transmitting ultrasonic frequency. This liquid preferably is of low volatility, low toxicity, and has very little adhesion; it may be, for example, a light mineral oil. The vial comprises a main body of glass, an interior and top edge that are entirely coated with a very thin layer of silver, and sufficient exterior, thin coating of silver to provide electrical connection in a circuit. It is frictionally supported by a plastic sleeve which comprises a tight-fitting collar 3 and a flange 5. The sleeve, which is attached to the cylindrical lower housing 4 by means of the flange 5 and three bolts 6, is in electrical connection with a source of electricity via annular contact disk 7 and conductor 8. The thin disk 7 is preferably dished and sufficiently resilient to ensure its maintenance of contact with the silver coating of the vial; it may be made, for example, of resilient Phosphor bronze.

Within the vial 1, and free of direct contact with it, there is an elongated, cylindrical glass electrode 9, which is entirely coated with platinum. This coating is very thin—sufficiently thin that the platinum in it costs so little that the electrode may be discarded after a single use of it with less expense than would be the cost of cleaning it. It is supported in a quickly detachable manner by means of plastic sleeve 10.

This sleeve is slightly resilient, like element 3–5 is preferably made of nylon, and has an inside bore of limited depth for frictional and quickly releasable clamping of the electrode 9. It is fixed to and surrounded by electrical-contact copper ring 12, and has a bore in which copper contact element 14 is fixed. The ring 12 is in movable but firm contact with the sping-loaded contact brush 16, which receives electricity from conductor 18, and is connected with element 14, via conductor 15, and thus supplies current to electrode 9.

The sleeve 10 is fixed by a set screw to a motor shaft 20. The motor 22 is fixed to a U-shaped bracket 24 by three bolts, 26. This bracket is attached to sleeve 4 by three screws, of which only one is shown at 28; and it and the motor are movably connected to a spaced pair of supports 30, by a spaced pair of lower arms 32, and a spaced pair of upper links 34, each of which is pivoted at one end on a stud that is fixed to the motor housing and at its other end to a stud on one of the supports 30. Located alongside each of the links 34, there is a tension spring 36, which has one end pivotally connected to stud 38 and its other end pivotally attached to stud 40 that is rigidly connected to support 30.

A housing 42, for covering and protecting the linkage 32, 34, 36, bracket 24 and the motor is fixed to the bracket 24. When the under side of this housing is manually grasped and lifted the tension spring 36 resists the rising motion until the spring's axis rises above pivot 44; at this time the spring snaps the link 34 on upward until it is stopped by the stop bar 46. There is a similar stop bar 48, which, like 46, is fixed at both ends to the supports 30, by screws 50.

Because the pivot pin 38 is vertically above the pin 52, and is the same distance above 52 as 44 is vertically above 54, the axis of the motor and vial remains vertical during the upward motion. Thus no blood is spilled from the vial.

After this lift the vial is manually pulled down, against the friction of collar 3, removed, and emptied; and electrode 9 is removed, against the friction of sleeve 10, and preferably discarded, instead of being cleaned. Preferably also the vial 1 is discarded; and it is replaced with a new vial, containing another sample of blood to be quickly tested.

This testing is preferably accomplished by means of the following devices: (1) the equipment described above by which a small blood sample in a vial is immersed and then quickly and efficiently withdrawn from an ultrasound-transmitting liquid; (2) means for generating ultrasound and transmitting it to the cup 2, and through the liquid to the vial and blood sample any known type of this ultrasonic generator may be used; it is schematically indicated at 56, comprising a high-frequency electric power supply and a crystal, 58, which is excited and vibrated by the current from the power supply; (3) an electronic circuit, comprising: an electric power supply, shown at 60; means for transmitting electric current of a predetermined voltage to and through the blood sample; means conducting the instantaneous current that comes from the blood and has a magnitude which is proportional to the flow of blood-oxygen ions through a resistor, 61, a first resistor, which acts as a shunt, bypassing a major portion of the current; means conducting the remaining, minor portion of the current through an electronic integrator, which comprises a condenser and therefore produces an output voltage that is proportional to the product of its input current and time, and continues to increase as long as blood-oxygen ions are flowing across the vial; and means for indicating the output voltage that is calibrated to provide a reading that is proportional to the oxygen content of the blood sample. When the flow of blood-oxygen ions ceases, the resultant constant reading indicates the amount of oxygen in the given quantity of blood in the sample.

The above-mentioned means for transmitting current to and through the blood sample comprises: control switch 62; conductor 18; elements 16, 12, 15 and 14; first and second electrodes comprising the electrode 9, which includes platinum or other noble metal, and the silver electrode coating inside and on the upper edge of the vial 1. One of these electrodes, hereinafter called the first electrode (which optionally may be the silver coating on the vial 1), receives current from the power supply, and the other electrode, called the second electrode (for example the rod 9), receives the varying-amperage current that passes thru the blood sample. From the second electrode (optionally, the rod 9) the current flows to the shunt resistor 61, from which the major portion of the current flows back to the power supply, via conductor 63 (or optionally via grounds). The remaining portion of the current is minor because the resistance of a second resistor 64, through which the minor current flows, is much greater than that of 61 (and preferably many times that of 61).

This resistor 64 is connected to an electronic integrator that comprises: an operational amplifier 66, which has a very high input resistance and a very high voltage gain; and a feedback element. This element includes conductor 68, condenser or capacitor 70, and conductor 72.

In the electronic integrator the amplifier greatly amplifies the minor input current and because of the condenser produces an output voltage which is proportional to the product of the input current and time. The duration of this time depends on the amount of oxygen in the blood of the sample.

OPERATION (1) A knob is turned, actuating four switches 62, 76, 78 and 80, to the standby position. Via switch 78, an external source of electric current, usually alternating current, is connected to the instrument's power supply, 60. This power supply, comprises a transformer, rectifier and filter, and provides direct current to amplifier 66 (preferably of the chopper-stabilized type) and alternating current, via conductors, to operate the chopper. In this standby position, the switches 62 and 80 remain open and switches 76 and 78 are closed. Switch 76 thus shunts condenser 70 and removes any stray charge that it might have accumulated; after this removal this switch is opened.

(2) The cover 42 is removed from the cup 2, which is filled to the proper level with the ultrasonic liquid.

(3) The rod electrode 9, is inserted in plastic sleeve 10 until it reaches the stop at the upper end of the lower bore in 10.

(4) The vial 1, containing a given volume of the blood to be tested (preferably 1 cc.), is inserted upward in collar 3 until its silvered top is in firm contact with contact disk 7.

(5) The vial and connected liquid-stirring motor are moved to their lowest position, determined by stop 48, in which a portion of vial 1 is immersed in the ultrasonic liquid.

(6) The switch knob is turned to the operation position, in which switch 78 remains closed, switches 62 and 80 are moved to closed position, switch 76 is opened, and switch 80 starts the stirring motor and the ultrasonic generator 56; and switch 62 closes the current circuit through the vial 1.

(7) The reading of meter 74 gradually increases in value as long as the output voltage from the current integrator is increasing, because the decreasing current from resistor 64 is being integrated with time. When all the blood-oxygen ions have moved through the solution to one of the electrodes in vial 1 and this current from 64 ceases, the build-up of output voltage in the integrator ends. The meter's reading then indicates the amount of oxygen in the blood sample.

(8) If the indicator were directly to register in ampere-seconds it would be necessary to compare its reading with a chart, to convert it into a reading of the proportion of the oxygen in the blood. But the invention optionally and preferably includes a specially calibrated indicator, 74. This calibration is designed to read in the number of volume units of oxygen that were in solution in the vial. The quantity of these units is accurately indicated by the indicator. Because of physicians' customary usage, the calibration is designed to read in volume of gaseous oxygen (in units of gaseous volume under standard conditions of temperature and pressure at sea level).

BLOOD SAMPLE PREPARATION (1) A small amount of one of the known substances which disintegrate blood cells into an ionized solution (preferably saponin, 2 or 3 drops, usually of a 1:1,000 solution) is added to the blood to be tested, and the mixture is manually stirred. This substance destroys the cell walls and releases the cell contents into solution.

(2) One mililiter (1 cubic centimeter) of this blood sample or solution is transferred to the vial 1.

THEORY OF THE INVENTED METHOD (1) Oxygen is contained in blood in two forms, one of which is dissolved in the plasma and the other is in chemical combination with the hemoglobin. The method of this invention pertains to the chemical reduction of the oxyhemoglobin (HbO), the chemical name of the oxygen-containing hemoglobin.

(2) In the above described solution, comprising blood and saponin, blood-oxygen atoms ionize and become negatively charged with two electrons, becoming bivalent ions (ions with a negative-two charge). These electrons are obtained from the hemoglobulin molecule.

(3) By supplying other electrons from the power supply 60, the blood-oxygen electrons are replaced and liberated from the molecules.

(4) These free blood oxygen ions constitute the electric current flowing to the positive electrode in the vial 1. At this electrode they react with hydrogen ions of the blood-and-saponin solution, producing water.

(5) Since it is necessary to supply two electrons for each released ion of oxygen, the number of the blood-oxygen ions is determined by the total number of electrons that replace these blood-oxygen ions during the chemical reduction of oxyhemoglobin.

(6) The current from the receptacle 1 is precisely divided into major and minor portions; the major portion is returned to the power source; and the minor portion is integrated with time in the integrator.

Figure 3:
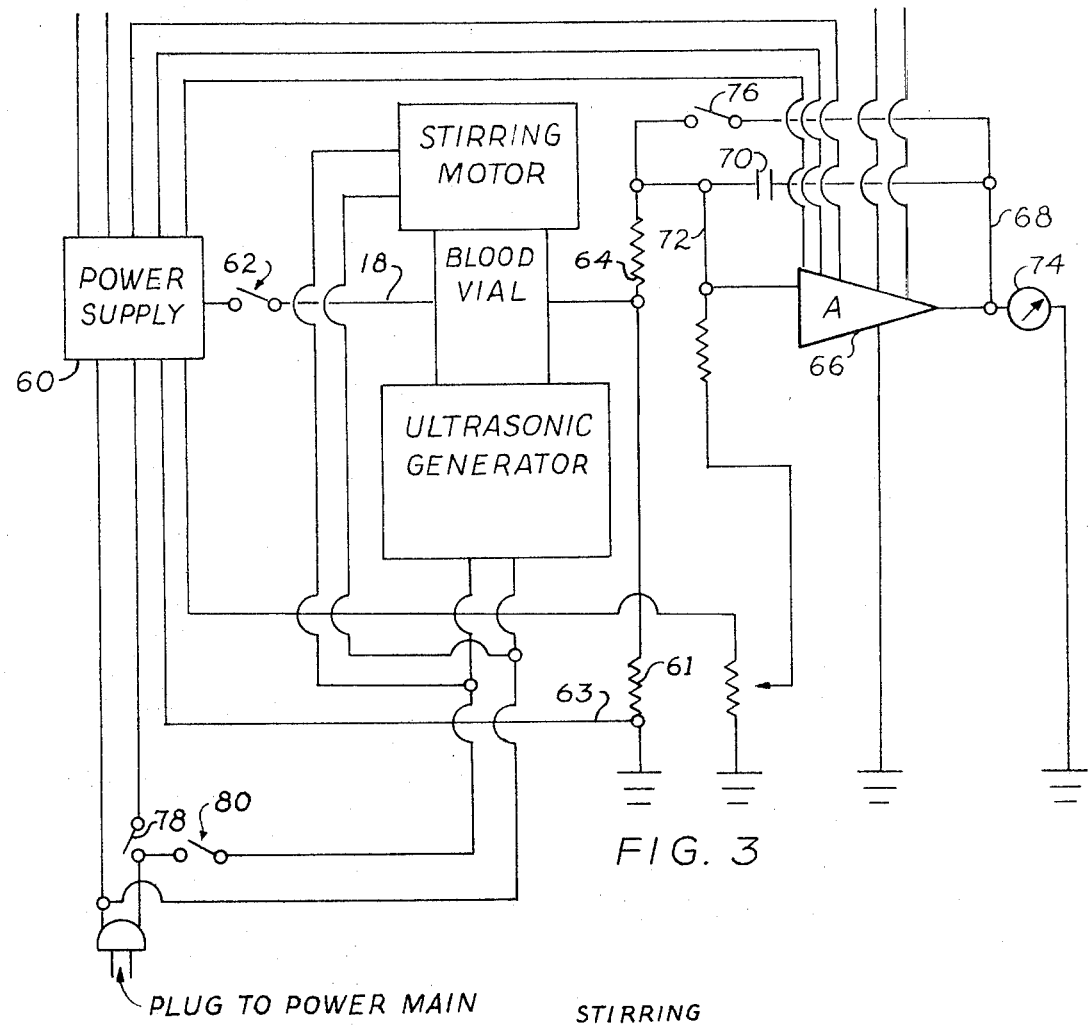
FIG. 3 is a diagram schematically illustrating the electronic part of the invention.
Figure 4:
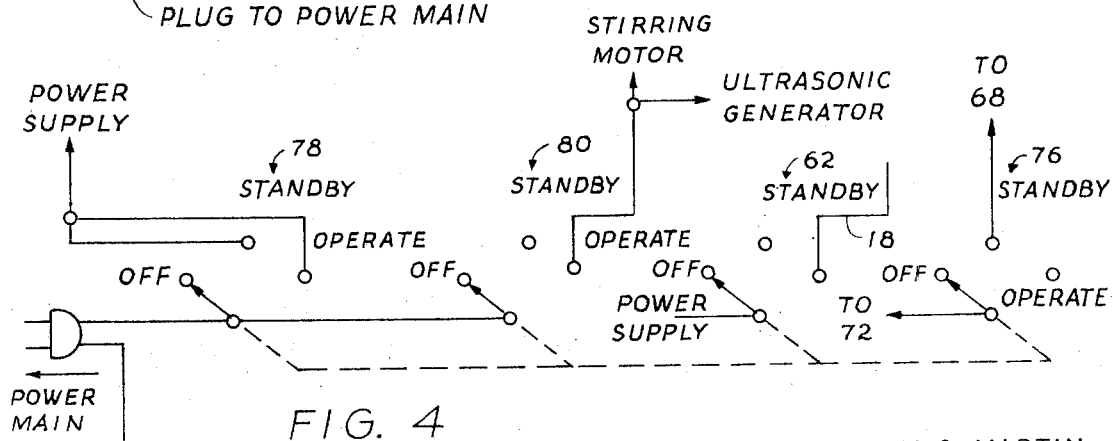
FIG. 4 is a schematic showing of details of the switches that are indicated in FIG. 3.

In the ionized solution of the blood sample there are a few ions other than those of the blood oxygen. These ions set up a very small current in the solution. To counteract their effect and provide for extra accuracy an optional step may be included in the method which comprises adding a biasing current to the said minor portion of the current from the blood sample, this biasing current being opposite and approximately equal to the small amount of current due to the ions that are not of the blood-oxygen type. The structure by which this step may be effected may comprise, for example, a voltage supply, a resistor (unnumbered in FIG. 3 but shown to the right of resistor 64 and below conductor 72) and conductive means electrically connecting this resistor and the electronic integrator.

The electrons may be measured in terms of the number of electronic charges (coulombs or ampere-seconds). In the circuit, this number of ampere-seconds that are required to reduce the oxyhemoglobin thus determines the reading of the meter or indicator 74.

Various changes in the specific disclosed structure may be made within the scope of the following claims.

We claim:

1. A method of measuring the amount of oxygen in a sample of blood, comprising the following steps:
   (1) mixing a predetermined amount of the blood to be tested with a substance that disintegrates the blood cells and frees electrically charged blood-oxygen ions, thus forming an ionized solution in a blood sample;
   (2) placing a pair of electrodes in said ionized solution;
   (3) placing a substantially constant electric potential from an electrical power source between said electrodes, thus causing a flow of blood-oxygen-ionized current of varying amperage thru said solution from one of said electrodes to the other;
   (4) precisely dividing said ionized current that emanates from one of said electrodes into major and minor portions and returning said major portion to said power source;
   (5) integrating the minor portion of said ionized current with time during the period of said flow; and
   (6) indicating the amount of integration of said ionized current with time.

2. A method as set forth in claim 1, in which the indication of step (6) is in terms of volume units of blood oxygen in said predetermined amount of blood.

3. A method as set forth in claim 1, which further comprises the step of adding a biasing current to said minor portion of ionizing current, said biasing current being approximately equal and opposite to the relatively small current set up in said ionized solution by ions other than said blood-oxygen ions.

4. Apparatus for measuring and indicating the amount of oxygen in a blood sample, comprising:
   means, including a receptacle, for holding in position for testing a blood sample, comprising a predetermined amount of blood;
   a source of electric current;
   first and second electrodes inside said receptacle;
   current-conducting means for connecting and supplying current from said source to said first electrode;
   a resistor, having one end connected to said second electrode;
   conductive means, electrically connecting the other end of said resistor to said source, for return of a major portion of the amperage from said second electrode to said source;
   an electronic integrator, for integrating amperage with time;
   conductive means, connecting said integrator and resistor, for conducting a minor portion of said amperage from the resistor to the integrator; and
   indicating means, electrically connected to said electronic integrator, having a calibration, the reading of which is proptional to the total of the integration of amperage with time in said integrator.

5. Apparatus as set forth in claim 4, in which markings of said calibration represent the units of volume of oxygen that are in said predetermined amount of blood.

6. Apparatus as set forth in claim 4, in which said conductive means between said resistor and integrator comprises a second resistor, a conductor between said second resistor and first-named resistor, and a conductor between said second resistor and integrator, and in which said electronic integrator comprises: an amplifier; a capacitor for storing the varying amperages in said integrator; and conductive means electrically connecting said capacitor and amplifier.

7. Apparatus set set forth in claim 4, in which said first eelctrode is a thin coating of silver on at least a portion of the inside surface of said receptacle, and in which said second electrode comprises a rod, extending downward into said ionized solution, and a thin coat of platinum on at least a portion of the surface of said rod.

8. Apparatus as set forth in claim 4, in which said second electrode comprises a rod-like element extending downward into said blood sample, and in which said apparatus further includes a motor for rotating said rod-like element and stirring said blood sample.

9. Apparatus as set forth in claim 4, which further comprises a generator of ultrasound, positioned close to said receptacle, ultrasonically agitating said blood sample.

10. Apparatus as set forth in claim 7, in which one of said electrodes projects downward into said blood sample, and said apparatus further comprises a motor for moving said last-named electrode and stirring said blood sample.

11. Apparatus as set forth in claim 9, in which said ultrasound generator comprises a container surrounding at least a portion of said receptacle and ultrasound-transmitting liquid in said container and in contact with said receptacle.

12. Apparatus as set forth in claim 11, in which said means for holding said blood sample further comprises: means for lowering said receptacle, with its axis in a substantially vertical position, into said liquid, and for thereafter raising the receptacle with its axis in a substantially vertical position; and means for quickly attaching said receptacle to and detaching it from said lowering means.

References Cited

UNITED STATES PATENTS 3,443,904   5/1969   Hill _____ 23—253

MORRIS O. WOLK, Primary Examiner

R. M. REESE, Assistant Examiner

U.S. Cl. X.R.

23—253, 254; 324—30; 134—1